United States Patent Office.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOSITION.

SPECIFICATION forming part of Letters Patent No. 617,450, dated January 10, 1899.

Original application filed March 1, 1898, Serial No. 672,211. Divided and this application filed November 2, 1898. Serial No. 695,260. (No specimens.)

*To all whom it may concern:*

Be it known that I, JOHN H. STEVENS, of the city of Newark, county of Essex, and State of New Jersey, have invented certain new and useful Improvements in Pyroxylin Compounds, of which improvements the following is a specification.

The compounds to which my invention relates generally consist of pyroxylin associated with solvents or other ingredients, and they are used in the arts as imitations of natural substances or in blasting or gunnery as explosives.

The pyroxylin is sometimes sold or used alone or associated with other substances. In whatever form the pyroxylin is employed, however, there is a danger of decomposition, especially under the influence of time or elevated temperatures. The exception to this is when the pyroxylin is kept thoroughly wet in an undissolved state, as is well understood.

The object of the present invention is to so form these compounds that the danger from decomposition will be prevented or reduced to a minimum. This I accomplish by combining with the pyroxylin or its admixture with other ingredients certain substances which I have found by experiment possess the power of preserving the pyroxylin in a remarkable manner.

This application is a division of my application, Serial No. 672,211, filed March 1, 1898.

The class of substances to which I refer are the urea salts of the aromatic acids. These acids consist principally of benzoic, salicylic, and naphtoic acids. There are numerous other acids of this series, although they are of little importance commercially, and hence I have selected those of most excellence as practical representatives of the entire class. The aromatic series of acids is well known to chemistry and needs no further description. While the urea salts of some of these acids are well known, some of them are difficult to procure in commerce, but are easily made. In using these salts as antacids I have in every case found them to be more or less efficient for the purpose, and I specify particularly benzoate of urea and salicylate of urea. The benzoate of urea is miscible with melted camphor and has a feebly solvent action on some forms of pyroxylin. These qualities demonstrate its compatibility with pyroxylin and pyroxylin compounds. The salicylate of urea resembles the benzoate in its compatibility with pyroxylin and camphor, but yields darker-colored products and is not as strong in preserving power as the urea benzoate, and of all these salts I prefer the benzoate of urea.

In practice I form pyroxylin compounds according to the usual well-known methods. The liquid solutions are made with sufficient excess of solvent to impart the requisite fluidity. The stiffer mixtures usually contain camphor or equivalent solid solvent along with sufficient liquid solvent for plastic effects.

Pyroxylin varies in its nature and solubility according to the purposes for which it is to be used. For smokeless powder or explosives the more highly-nitrated varieties are employed and solvents specially fitted for making solutions with such pyroxylin are also used.

While the preserving substances can be mixed with the pyroxylin either direct or in solution, it is best in order to insure a perfect mixture and intimate contact to have the preserving salt dissolved in some compatible menstruum and filtered. For this reason the best effects are produced with the salts which are soluble in wood-spirits or grain-alcohol. As to proportions, I have found that one part of the preserving salt to one hundred parts of pyroxylin is sufficient to render the pyroxylin or the compounds made with it of good stability. For extraordinary stability two per cent. is ample. Of course where I have indicated feebleness of preserving power more than two per cent. could be used to advantage. I recommend, however, the use of the preferred salts or those which I have mentioned as best suited for these purposes. I find that for the best effects it is well to employ the salts possessing the strongest preserving power, as obviously large proportions are undesirable.

I do not confine myself to any particular proportions nor to the particular urea salts specifically mentioned by name, as I believe that I have proved that all of the urea salts of the aromatic acids are more or less useful.

I have no explanation to offer for this peculiar preserving power of salts where the bases have already been saturated with an acid. I can only state that my experiments have demonstrated that they possess this power. I do find, however, that the nature of the acid radical present in the salt affects its preserving power. Thus, as stated, for instance, the salicylate of urea is not as strong in preserving power as the urea benzoate. My experiments also show that in the case of urea salts of acids containing two or more dissimilar acid radicals the preserving action depends on the nature of the acid radical. Thus, a urea salt containing the radical of benzoic acid would have more antacid effect even though the other acid radical or radicals present possessed no power to form antacid salts. Similarly the salts containing two or more bases united to a single acid act as antacids according to the proportions of the constituents. Hence I include in my invention the series of urea salts of aromatic acids in pyroxylin compositions of matter whether the salts are simple, compound, mixed; or associated chemically with other salts.

Having thus described my invention, what I claim, and desire to secure by Letters Patent, is—

1. A pyroxylin compound consisting of pyroxylin in combination with a urea salt of an acid of the aromatic series containing carboxyl (COOH), substantially as described.

2. A pyroxylin compound consisting of pyroxylin and a solvent of the same, associated with a urea salt of an acid of the aromatic series containing carboxyl (COOH), substantially as described.

3. A transparent composition of matter containing pyroxylin and a urea salt of an acid of the aromatic series containing carboxyl (COOH), substantially as described.

4. A transparent composition of matter containing pyroxylin and a solvent of the same associated with a urea salt of an acid of the aromatic series containing carboxyl (COOH), substantially as described.

5. A pyroxylin compound containing pyroxylin and urea benzoate, substantially as described.

6. A pyroxylin compound containing pyroxylin, and a solvent of the same, and urea benzoate, substantially as described.

JOHN H. STEVENS.

Witnesses:
WALTER P. LINDSLEY,
MARY R. EISLLE.